United States Patent [19]

Leroy et al.

[11] Patent Number: 4,720,885

[45] Date of Patent: Jan. 26, 1988

[54] WIPING ARRANGEMENT FOR WINDOWS OF VEHICLES

[75] Inventors: Andre Leroy, Mons, Belgium; Jean M. Flamme, Beloeil, France

[73] Assignee: Robert Bosch GmbH, Stuttgart, Fed. Rep. of Germany

[21] Appl. No.: 16,989

[22] Filed: May 6, 1987

Related U.S. Application Data

[63] Continuation of Ser. No. 796,578, Nov. 8, 1985, Pat. No. 4,683,605.

[30] Foreign Application Priority Data

Nov. 14, 1984 [BE] Belgium .................. 901052

[51] Int. Cl.⁴ .................................. B60S 1/02
[52] U.S. Cl. ........................ 15/250.21; 15/250.31
[58] Field of Search ........... 15/250.21, 250.23, 250.35, 15/250.31, 250.34

[56] References Cited

U.S. PATENT DOCUMENTS

| | | | |
|---|---|---|---|
| 3,482,275 | 12/1969 | Fux | 15/250.23 X |
| 3,599,270 | 8/1971 | Mori | 15/250.23 |
| 3,729,766 | 5/1973 | Buchanan, Jr. | 15/250.21 |

FOREIGN PATENT DOCUMENTS

| | | |
|---|---|---|
| 879446 | 10/1979 | Belgium . |
| 891806 | 1/1982 | Belgium . |
| 892029 | 9/1982 | Belgium . |
| 2178182 | 11/1973 | France . |
| 2178683 | 11/1973 | France . |

*Primary Examiner*—Peter Feldman
*Attorney, Agent, or Firm*—Michael J. Striker

[57] ABSTRACT

The wiper arm is fixedly connected with a rod of the five-link linkage, the transmission members of which include a frame stationarily arranged with respect to the body of the vehicle, a swinging member connected with the frame, two rods connected with one another, the first one being also connected with the swinging member, and a swinging lever connected with the frame and with the second rod, this swinging lever being driven by the pushing crank transmission. In this spatial five-link linkage, the hinges connecting the swinging member and the swinging lever with the frame are formed as pivotal connections, the hinge connecting one of the rods and one of its adjoining members is a spherical one, and the hinge between this rod and its adjoining member is formed as a pivotal connection, the axis of which is obliquely located with respect to the axis of one at least of the other pivotal connections in the linkage.

8 Claims, 4 Drawing Figures

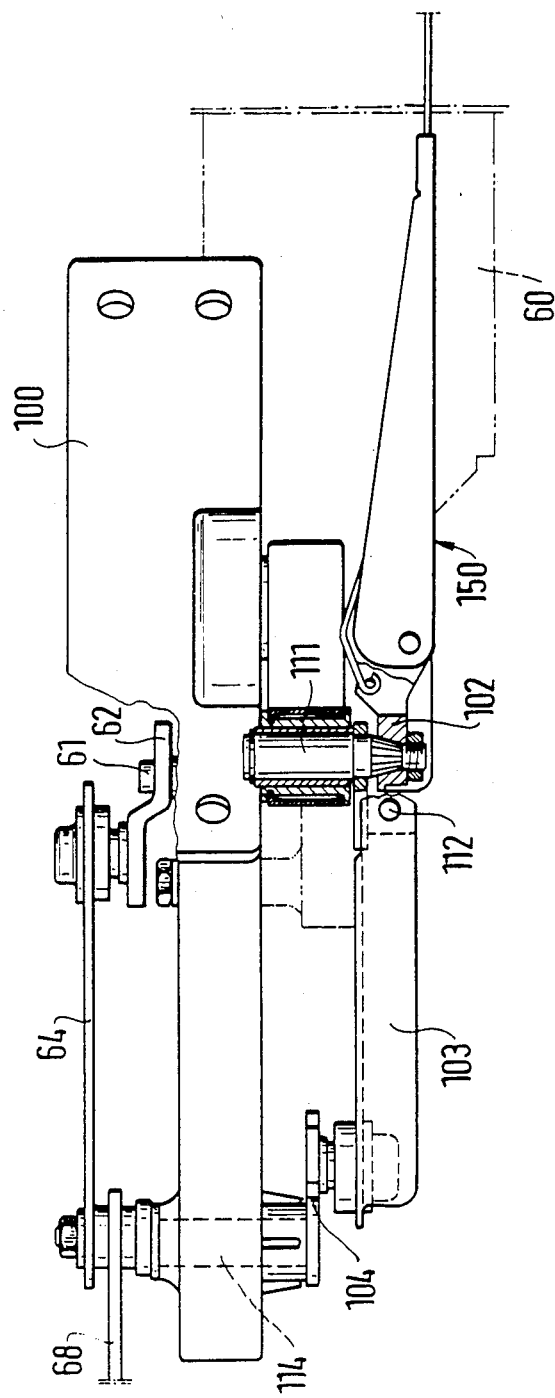

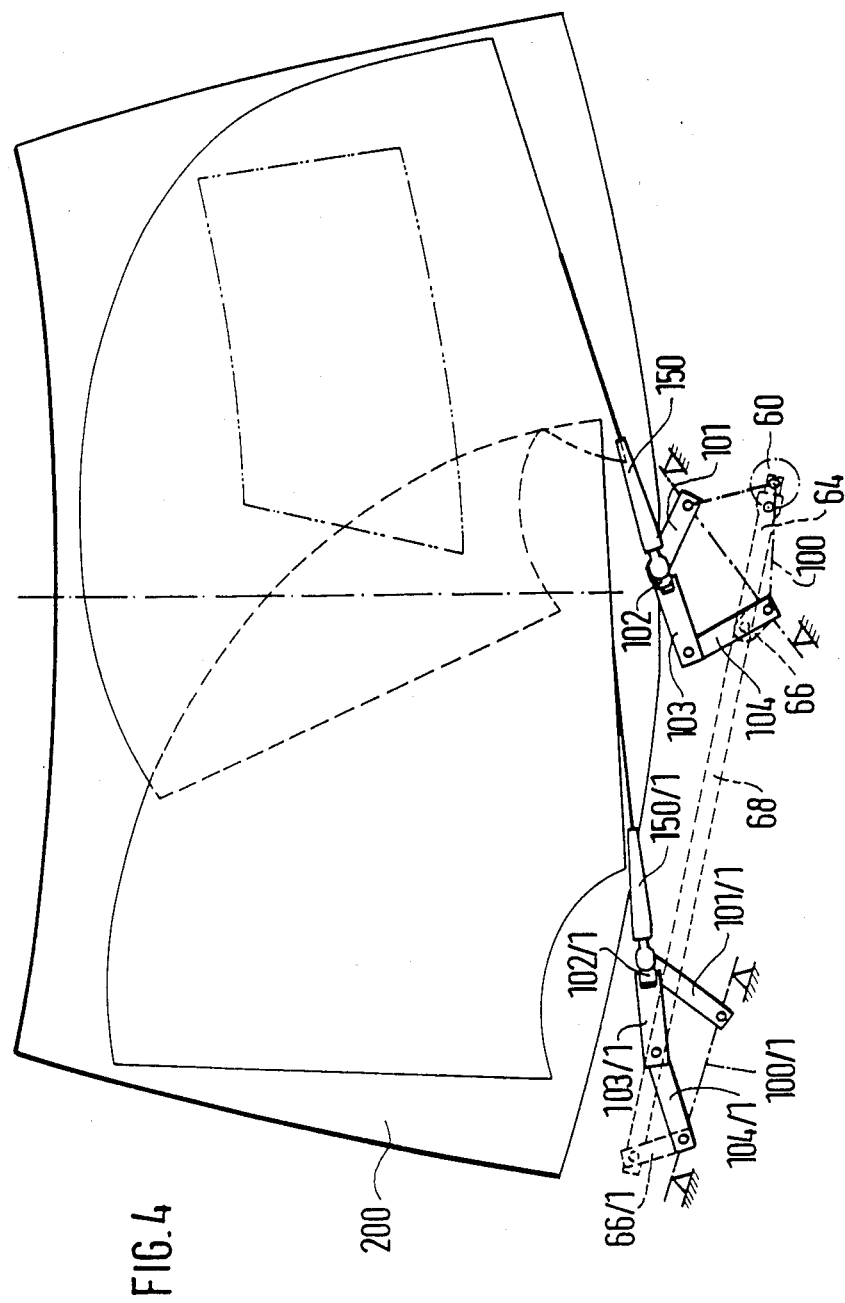

WIPING ARRANGEMENT FOR WINDOWS OF VEHICLES

This is a continuation of application Ser. No. 796,578, filed Nov. 8, 1985 now U.S. Pat. No. 4,683,605.

BACKGROUND OF THE INVENTION

The present invention relates to a wiping arrangement for windows of vehicles, comprising a wiper the movement of which enables to cover on a given window pane a predetermined surface which is defined in its shape and its location with a certain freedom, and which remains identical in the reciprocating movement. The wiper is composed, as usual, of a wiping blade hinged on a wiper arm composed of two articulately connected elements which are stressed by a spring in a way to apply the blade on the window to be wiped.

In most of the known wiping arrangements which have the same purpose, a swinging member of a linkage is driven into a reciprocating rotary movement, which is parallel to the wiping movement of the wiping blade. The wiping arm is thereby guided by this element, however with a degree of freedom which is controlled by a mechanism providing an additional movement coordinated with the wiping movement.

The known systems differ from one another by the manner in which the wiper arm is guided. French Pat. No. 2,178,683 discloses a coulisse in the case of a translation freedom. French Pat. No. 2,178,182 describes a deformable parallelogram linkage in the case of circular displacement freedom. The last system is also disclosed in the Belgium Pat. Nos. 879,446; 891,806 and 892,029. In these systems in general the additional movement is produced by transmissions with constant or variable transmission ratio, depending on the selected system.

In these of the known systems, in which a linkage is used to drive the wiper arm, this linkage is a plane one.

SUMMARY OF THE INVENTION

In the wiping arrangement of the present invention, a wiper arm is fixedly connected with a member, different from a swinging member, of a spatial five-link linkage the instantaneous rotation axis of which is driven into a complex movement. The five-link linkage, having one degree of freedom, changes the alternating rotary movement (quite different from the wiping movement) of a swinging member of the five-link linkage into a complex alternating movement of the upper arm.

The spatial character of the linkage appears through the odd number of its members and through the organization of their connections; one of these connections is a spherical one and the others are pivotal connections, one at least among these pivotal connections having an axis which is obliquely located with respect to the axis of the others.

In such a spatial linkage, the level of the internal forces resulting from the complex movement of the wiper arm can be notably reduced with respect to the level of the internal forces in a plane linkage which would set the wiper blade in a similar motion on the windshield.

BRIEF DESCRIPTION OF THE DRAWING

FIG. 3 is a plane view of the five-link linkage of FIG. 3; and

FIG. 4 is a view schematically showing a twin-arm wiping device formed in accordance with the present invention.

DESCRIPTION OF A PREFERRED EMBODIMENT

Figure 1:
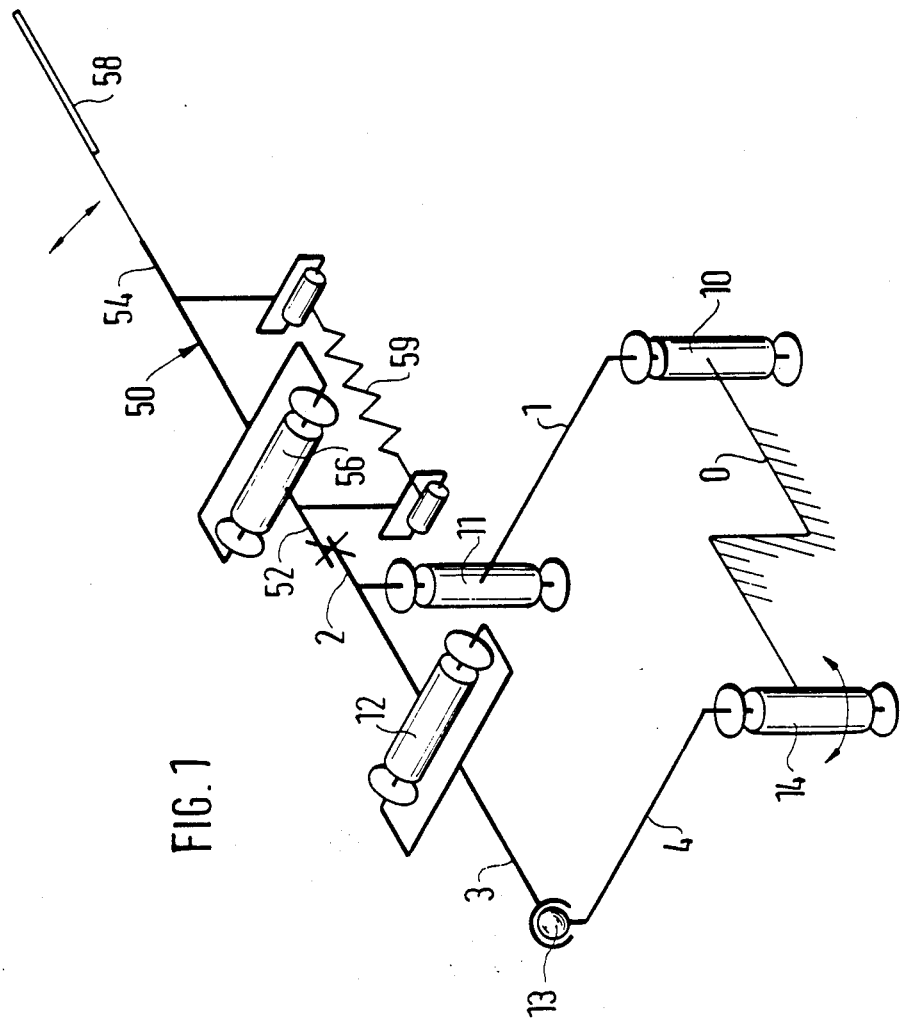
FIG. 1 is a view showing schematically a five-link linkage and a wiping arrangement in accordance with the present invention.

A general structure of a five-link linkage and a wiping arrangement is shown in FIG. 1. It has a housing-like frame 0 fixedly connected with the body of the vehicle, a swinging lever 4 which is connected with the frame 0 via a pivot pin support 14 and driven into a swinging movement by a geared motor and a swinging transmission or directly by a suitable transmission. The five-link linkage has further a coupling rod 3 which is connected by a hinge 13 with the swinging lever 4, and a supporting rod 2 of the five-link linkage is fixedly connected with a wiper arm 50. The supporting rod is connected with the coupling rod 3 via a pivot pin 12, and a swinging member 1 also is a part of the five-link linkage and is connected with the supporting rod 2, on the one hand, and with the frame 0, on the other hand, via pivot pins 11 and 10.

The pivot pin connections and the hinge connections can be formed in the following manner.

In accordance with one embodiment, the coupling rod 3 is connected via the spherical hinge 13 with the swinging lever 4 and through the pivot pin 12 with the supporting rod 2 so that the axis of the pivot pin 12 extends transversely, particularly normally or approximately normally, to the axis of the pivot pin 11 between the supporting rod 2 and the swinging member 1.

In accordance with another embodiment of the invention, the coupling rod 3 is connected via the spherical hinge 13 with the supporting rod 2 and by the pivot pin 12 with the swinging lever 4 so that the axis of the pivot pin 12 extends transversely and particularly normally or approximately normally to the axis of the pivot pin 14 between the swinging lever 4 and the frame 0.

The thus designed system allows the relative angular adjustment of the axes of the pivot pins [with the exception of the pivot pins mentioned in the above two embodiments] to be selected freely. It also allows, by means of the supporting rod 2 and the swinging member 1 which form a very short open chain, to transmit to the frame the forces resulting from the pressing force of the wiping blade against the windshield pane and the greater part of the mass forces.

The system also allows, by a respective selection of the relative inclined position of the axes of both pivot pins of the swinging member, to vary periodically the value of the pressing force of the wiping blade against the windshield pane and thereby to change the lifting of the wiping blade where otherwise it is produced. The recommended value of the relative inclined position of both respective axes lies between 15° and 45°.

If periodical varying of the value of the pressing force is not performed and when the axes of all hinges with the exception of the hinge between the supporting rod 2 and the coupling rod 3 in the first embodiment or the hinge between the coupling rod 3 and the swinging lever 4 in the second embodiment, are arranged parallel to one another, the spherical hinge can be replaced by a pivot pin whose axis extends parallel to the axes of all other pivot pins. In addition, the maintained inclined pivot pin can be replaced by a limitedly deformable connection, for example a silent block.

The invention is especially interesting in the case of a twin-arm wiping device. In this case one wiping arm is fixedly connected with the supporting rod of the five-link linkage according to the invention, whereas the other wiper arm can be offset about an axis which is fixed relative to the body of the vehicle in a swinging movement. It is also possible that the wiper arm is fixedly connected with the supporting rod to offer further five-link linkage formed in accordance with the present invention. Regardless of the selection between these two possibilities, the movement of the wiper arms relative to one another is coordinated and performed in the same direction.

When only one wiper arm in accordance with the present invention is guided and driven, the swinging movement of a swinging member 4 in the five-link linkage of the inventive wiping arrangement is coordinated with the swinging movement of the other wiping arm and these both movements are directed opposite from one another.

When both wiping arms in accordance with the present invention are guided and driven, the swinging movements of both driven swinging levers 4 are coordinated with one another and performed in the same direction. When both five-link linkages guiding and driving the wiper arms are supported in the proximity to the plane of symmetry of the windshield pane, both five-link linkages logically have the common frame 0.

Whether the wiping arrangement in accordance with the present invention has only one wiper arm which is guided and driven in accordance with the invention, or two such wiper arms whose swinging movements of the swinging lever and the swinging movements of the window wiper movable about a fixed axis or the swinging movements of both swinging levers are performed, this can be obtained by a classic transmission motor by means of a swinging transmission supported inside the body of the vehicle.

Figure 2:
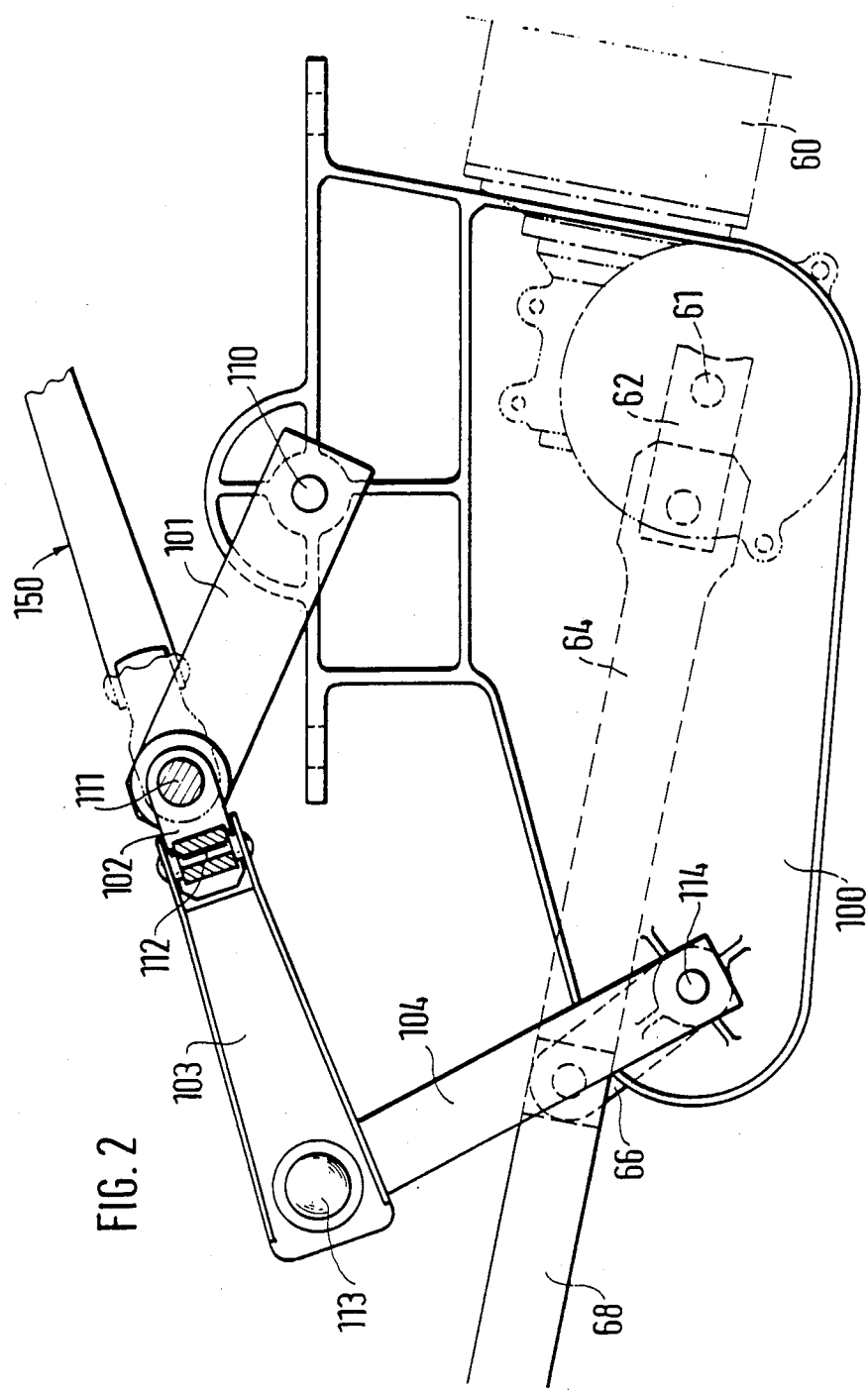
FIG. 2 is a side view of the five-link linkage of the inventive arrangement.

In a very simple construction, the only movable elements of this swinging transmission are a crank 62 [FIG. 2] and a connecting rod 64.

FIGS. 2 and 3 show the inventive five-link linkage, whereas FIG. 4 is a schematical showing of the twin-arm wiping arrangement formed in accordance with the present invention.

It should be added to the above described general showing of FIG. 1, that the wiper arm 50 is composed of two parts 52 and 54 which are connected with one another via hinge 56. The wiper arm part 54 is provided at its free end which faces from the hinge 56, with a wiping blade 58. The wiping blade 58 is biased against a pane 200 to be wiped by a prestressed spring 59 which extends over the hinge 56 and is connected with both wiper arm parts 52 and 54.

In the arrangements shown in FIGS. 2, 3 and 4 the structural parts which correspond to schematically shown elements of FIG. 1 are identified with reference numerals which are greater by one-hundred than the reference numerals in FIG. 1. As can be seen from FIG. 4, wiper arms 150 or 150/1 are fixedly connected with the supporting rods 102 or 102/1. The supporting rods 102 or 102/1 are articulately connected with coupling rods 103 or 103/1 on the one hand, and with swinging members 101 or 101/1 on the other hand via a pivot pin. Coupling rods 103 or 103/1 are connected with swinging levers 104 or 104/1 by spherical hinges, whereas the swinging members 101 or 101/1 as well as the swinging levers 104 or 104/1 are connected with 100 or 100/1 mounted on the vehicle chassis.

The swinging lever 104 is fixedly connected with a shaft that belongs to a bearing 114. A swinging arm 66 is mounted on this shaft and driven in into a swinging movement by the connected rod 64. The connecting rod 64 is driven by the crank 62 mounted on a driven shaft 61 of a geared motor 60. The swinging lever 104/1 is connected with the shaft 114/1. A swinging arm 66/1 is mounted on the shaft 114/1 and driven in a swinging movement via a coupling rod 68. The coupling rod 68 is driven by the swinging arms 66 so that the movements of the swinging arms 66 and 66/1 are performed in the same direction.

In the above illustrated example the lower end of the wiper arm 150/1 is located at a relatively great distance from the plane of symmetry of the windshield pane. The tendency of this wiper arm for lifting can be counteracted in that the axes of the hinges of the swinging members are inclined so that the pressing force of the wiping blade 58 against the windshield pane 200 [FIG. 4] varies with the angular position of the wiping lever.

It will be understood that each of the elements described above, or two or more together, may also find a useful application in other types of constructions differing from the types described above.

While the invention has been illustrated and described as embodied in a wiping arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A wiping arrangement for windows of vehicles, comprising a wiper arm which carries a wiping blade; drive means providing a rotary movement; and swinging transmission means arranged to change the rotary movement of said drive means into a complex alternating movement to said wiper arm, said swinging transmission means including a pushing crank transmission and a subsequently arranged spatial five-link linkage having one degree of freedom, said five-link linkage having five rigid transmission members and hinges connecting said transmission members with one another, said wiper arm being fixedly connected with a rod of said five-link linkage, said transmission members including a frame arranged stationarily with respect to the body of the vehicle, or including the body itself of the vehicle, a swinging member which is connected with said frame via a hinge formed as a pivotal connection, a first rod which is connected with said swinging member via one of said hinges, a second rod which is connected with the first rod via another of said hinges, and a swinging lever driven by said pushing crank transmission, said swinging lever connected with said second rod via a further of said hinges and also connected via still a further of said hinges formed as a pivotal connection with said frame, said hinges provided on said frame being arranged at a distance from one another, said hinge between one of said rods and one of its adjoining members being a spherical one and said hinge between this rod and its other adjoining member being formed as a pivotal connection the axis of which is obliquely located with respect to the axis of one at least of the other pivotal connections comprised in said spatial, five-link linkage.

2. A wiping arrangement as defined in claim 1, wherein said drive means are a special electric drive motor providing an alternating rotary movement so as to directly drive said swinging lever of said five-link linkage without said pushing crank transmission.

3. A wiping arrangement as defined in claim 1, wherein said first rod is supporting said wiper arm, wherein said second rod is a coupling rod and wherein said hinge between said supporting rod and said coupling rod is the spherical one.

4. A wiping arrangement as defined in claim 1, wherein said hinge between first and second rods is formed as a pivotal connection, wherein the axes of the other pivotal connections are approximately parallel to one another and wherein the axis of said pivotal connection between said first and second rods is approximately perpendicular to the axes of said other pivotal connections.

5. A wiping arrangement as defined in claim 1, wherein the axis of all the pivotal connections are approximately parallel to one another, except the axis of one of said hinges between said swinging member and said first rod, between said first and second rods or between said second rod and said swinging lever, this axis being approximately perpendicular to the axis of the other pivotal connections, and this transverse pivotal connection being formed as a connecting element deformable under increasing tension.

6. A wiping arrangement as defined in claim 1, wherein a second wiper arm is fixedly mounted on one rod of a second spatial five-link linkage designed as the first one, the swinging levers of both spatial linkages being coupled so that their movements are coordinated and directed in the same direction.

7. A wiping arrangement as defined in claim 1, wherein a second wiper arm is swingable about a stationary axis and wherein the swinging lever of said five-link linkage and the wiper arm which is swingable about the stationary axis perform mutually coordinated swinging movements in opposite directions.

8. A wiping arrangement as defined in claim 1, wherein said wiper arm is the only one.

* * * * *